United States Patent
Son et al.

(10) Patent No.: US 7,603,147 B2
(45) Date of Patent: Oct. 13, 2009

(54) SYSTEM AND METHOD FOR PERIODIC RANGING IN A SLEEP MODE IN A BWA COMMUNICATION SYSTEM

(75) Inventors: Yeong-Moon Son, Anyang-si (KR);
Chang-Hoi Koo, Seongnam-si (KR);
Jung-Je Son, Seongnam-si (KR);
Hyoung-Kyu Lim, Seoul (KR);
Hyun-Jeong Kang, Seoul (KR);
So-Hyun Kim, Suwon-si (KR);
Sung-Jin Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 450 days.

(21) Appl. No.: 11/125,278

(22) Filed: May 9, 2005

(65) Prior Publication Data
US 2005/0266896 A1   Dec. 1, 2005

(30) Foreign Application Priority Data
May 7, 2004   (KR) ............... 10-2004-0032156

(51) Int. Cl.
*H04B 1/38* (2006.01)
*H04B 7/00* (2006.01)
(52) U.S. Cl. .................... 455/574; 455/522; 455/127.4; 455/127.5
(58) Field of Classification Search ............... 455/450, 455/561, 4.1, 4.2, 22, 574, 127.1, 127.4, 455/127.5, 343.55; 370/278, 311, 466
See application file for complete search history.

(56) References Cited

U.S. PATENT DOCUMENTS

| 6,519,449 B1 * | 2/2003 | Zhang et al. ............... 455/69 |
| 6,594,305 B1 | 7/2003 | Roeck et al. |
| 6,690,655 B1 * | 2/2004 | Miner et al. ............ 370/278 |

FOREIGN PATENT DOCUMENTS

JP   2001-223634   8/2001

(Continued)

OTHER PUBLICATIONS

Yeong-Moon Son et al., Sleep Mode Supporting the Periodic Ranging With Compressed Format of SLP ID Fields in MOB_TRF_IND Message-Harmonization Ad-Hoc Consensus Contribution, Aug. 17, 2004.

(Continued)

*Primary Examiner*—Eugene Yun
(74) *Attorney, Agent, or Firm*—The Farrell Law Firm, LLP

(57) ABSTRACT

A system for a periodic ranging in a BWA communication system. In the system, a receiver in a sleep mode of a wireless communication system receives a sleep mode transition message, which including first information relating to a timing point at which the periodic ranging is performed, from a transmitter, transits to the sleep mode, and performs the periodic ranging at a timing point corresponding to the first information. Accordingly, the periodic ranging of the receiver in the sleep mode can be performed.

19 Claims, 8 Drawing Sheets

FOREIGN PATENT DOCUMENTS

| | | |
|---|---|---|
| JP | 2003-318859 | 11/2003 |
| KR | 2005-24125 | 3/2005 |
| RU | 2 142 672 | 6/1996 |
| WO | WO 02/33853 | 4/2002 |
| WO | WO 03/069934 | 8/2003 |

OTHER PUBLICATIONS

Yeongmoon Son et al., "Periodic Ranging in Sleep Mode", IEEE 802.16 Broadband Wireless Access Working Group, Mar. 17, 2004.

Antonis Karvelas, SS - Initial Ranging, IEEE 802.16.1c-01/19, IEEEE 802.16 Task Group, Mar. 7, 2001.

* cited by examiner

SYSTEM AND METHOD FOR PERIODIC RANGING IN A SLEEP MODE IN A BWA COMMUNICATION SYSTEM

PRIORITY

This application claims priority under 35 U.S.C. § 119 to an application entitled "System and Method for Periodic Ranging in Sleep Mode in BWA Communication System" filed in the Korean Intellectual Property Office on May 7, 2004 and assigned Serial No. 2004-32156, the contents of which are hereby incorporated by reference.

BACKGROUND OF THE INVENTION

1. Field of the Invention

The present invention relates generally to a system and a method for a periodic ranging in a Broadband Wireless Access (BWA) communication system, and more particularly to a system and a method for performing a periodic ranging of a Mobile Station (MS) that remains in a sleep mode.

2. Description of the Related Art

In a 4$^{th}$ generation (4G) communication system, which is the next generation communication system, research is being performed to provide users with services having various Qualities of Service (QoS) at a high speed. In particular, in the current 4G communication system, research has been actively pursued to support a high speed service capable of ensuring mobility and QoS in a BWA communication system such as a wireless Local Area Network (LAN) system and a wireless Metropolitan Area Network (MAN) system.

A representative communication system of the 4G communication system is an Institute of Electrical and Electronics Engineers (IEEE) 802.16a communication system and an IEEE 802.16e communication system. The IEEE 802.16a communication system and the IEEE 802.16e communication system utilize an Orthogonal Frequency Division Multiplexing (OFDM) scheme/an Orthogonal Frequency Division Multiple Access (OFDMA) scheme to support a broadband transmission network for a physical channel of the wireless MAN system. The IEEE 802.16a communication system considers only a single cell structure and stationary subscriber stations (SSs), which means the system does not accommodate the mobility of the SSs at all. However, the IEEE 802.16e communication system accommodates the mobility of an SS in the IEEE 802.16a communication system. Here, an SS having mobility is referred to as a Mobile Station (MS).

FIG. 1 is a block diagram schematically illustrating a conventional IEEE 802.16e communication system. Referring to FIG. 1, the IEEE 802.16e communication system has a multi-cell structure, i.e., a cell 100 and a cell 150. Further, the IEEE 802.16e communication system includes a Base Station (BS) 110 that controls the cell 100, a BS 140 that controls the cell 150, and a plurality of MSs 111, 113, 130, 151, and 153. The transmission/reception of signals between the BSs 110 and 140 and the MSs 111, 113, 130, 151, and 153 is accomplished using an OFDM/OFDMA scheme.

In FIG. 1, the MS 130 is located in a boundary area (or a handover area) between the cell 100 and the cell 150. That is, when the MS 130 moves into the cell 150 controlled by the BS 140 while communicating with the BS 110, a serving BS of the MS 130 changes from the BS 110 to the BS 140.

Because the IEEE 802.16e communication system accommodates the mobility of an MS, power consumption of the MS is an important factor in the entire system. Accordingly, a sleep mode operation and an awake mode operation corresponding to the sleep mode operation between the MS and the BS have been proposed to minimize the power consumption of the MS. More specifically, the MS periodically performs a ranging operation for compensating for a timing offset, a frequency offset, and power with the BS in order accommodate changes in channel conditions with the BS.

Further, because the IEEE 802.16e communication system accommodates the mobility of an MS, a periodic ranging of the ranging operation is growing more important.

FIG. 2 is a diagram schematically illustrating a conventional sleep mode operation in the IEEE 802.16e communication system. However, before a description of FIG. 2 is given, it should be noted that the sleep mode has been proposed in order to minimize power consumption of an MS in an idle interval, in which packet data are not transmitted, when the packet data are transmitted. That is, in the sleep mode, the MS and a BS simultaneously transit to the sleep mode, thereby minimizing the power consumption of the MS in the idle interval in which the packet data is not transmitted.

More specifically, the packet data is burst when generated. Accordingly, it is unreasonable that the same operation is performed in both an interval in which the packet data are not transmitted and an interval in which the packet data are transmitted. Therefore, the sleep mode operation as described above has been proposed.

When packet data to be transmitted is generated while both the MS and the BS are in the sleep mode, the MS and the BS must simultaneously transit to the awake mode and must transmit/receive the packet data.

The sleep mode operation described above is proposed not only in terms of power consumption but also as a scheme for minimizing interference between channel signals. However, because traffic has a large influence on the packet data character, the sleep mode operation must be performed in consideration of the traffic characteristic, the transmission scheme characteristic, etc., of the packet data.

Referring to FIG. 2, a reference numeral 211 identifies the generation pattern of packet data and includes a plurality of ON intervals and OFF intervals. The ON intervals are burst intervals in which packet data (or traffic) is generated and the OFF intervals are idle intervals in which the traffic is not generated. The MS and the BS are transitted to a sleep mode and an awake mode according to the traffic generation pattern as described above, such that the power consumption of the MS can be minimized and interference between channel signals can be prevented.

Reference numeral 213 identifies the mode transition of a BS and an MS, and includes a plurality of awake modes and sleep modes. In the awake modes, traffic is generated and packet data is exchanged. In the sleep modes, the traffic is not generated and the packet data is not exchanged between the MS and the BS.

Reference numeral 215 identifies the MS power level. As illustrated in FIG. 2, when the MS power level is K in the awake mode, the MS power level is M in the sleep mode. When the MS power level K in the awake mode is compared with the MS power level M in the sleep mode, the M has a value much smaller than that of the K. That is, because the packet data is not exchanged in the sleep mode, the power of the MS is not consumed as much.

In order to transit to the sleep mode, an MS must receive a mode transition approval from a BS. The BS approves a mode transition to a sleep mode of the MS and transmits packet data. Further, the BS must inform the MS that packet data to be transmitted to the MS exists during a listening interval of the MS. Herein, the MS must awake from the sleep mode and confirm if there is packet data to be transmitted from the BS to the MS. The listening interval will be described later in more detail.

As a result of the confirmation by the MS, when there is the packet data to be transmitted from the BS to the MS, the MS transits to the awake mode and receives the packet data from the BS. However, when there is no packet data to be transmitted from the BS to the MS, the MS may return to the sleep mode or maintain the awake mode.

Parameters required for supporting the sleep mode operation and the awake mode operation will be described herein below.

(1) Sleep Identifier (SLPID)

The SLPID proposed by the IEEE 802.16e communication system corresponds to a value allocated through a Sleep-Response (SLP-RSP) message when the MS transits to the sleep mode, which is used as a specific value for only MSs staying in the sleep mode. That is, the SLPID is an identifier for differentiating MSs in the sleep mode including a listening interval. When the corresponding MS transits to the awake mode, an SLPID is restored to the BS and may be reused for an MS intended to transit to the sleep mode through the SLP-RSP message. The SLPID has a size of 10 bits and it is possible to support 1024 MSs performing the sleep mode operation using the SLPID.

(2) Sleep Interval

The sleep interval, which is requested by the MS, may be allocated by the BS according to the request of the MS. The sleep interval is a time interval for which the MS transits to the sleep mode and then maintains the sleep mode until the listening interval starts. The sleep interval may be defined as a time for which the MS stays in the sleep mode.

The MS may continuously stay in the sleep mode when there is no data to be transmitted from the BS to the MS, even after the sleep interval. In such a case, the MS increases and updates the sleep interval by a preset initial-sleep window value and a final-sleep window value. The initial-sleep window value represents an initial minimum value of the sleep interval and the final-sleep window value represents a final maximum value of the sleep interval. The initial-sleep window value and the final-sleep window value may be expressed by the number of frames. The initial-sleep window value and the final-sleep window value will be described later in more detail.

The listening interval, which is requested by the MS, may be allocated by the BS according to the request of the MS. That is, the listening interval is a time interval for which the MS awakes from the sleep mode momentarily, synchronizes with a downlink signal of the BS, and receives downlink messages such as traffic indication (TRF-IND) messages. The TRF-IND message identifies if there is a TRF-IND, i.e., packet data, to be transmitted to the MS. The TRF-IND message will be described later in more detail.

The MS continuously waits to receive the TRF-IND message for the listening interval. If a bit representing the MS in an SLPID bitmap included in the TRF-IND message has a value indicating a positive indication, the MS continuously maintains the awake mode. As a result, the MS transits to the awake mode. However, if the bit has a value indicating a negative indication, the MS transits to the sleep mode again.

3) Sleep Interval Update Algorithm

When the MS shifts to the sleep mode, the MS determines the sleep interval from a preset minimum window value as a minimum sleep mode period. After the MS awakes from the sleep mode for the listening interval and confirms an absence of packet data to be transmitted from the BS, the MS sets the sleep interval to have a value corresponding to twice that of the previous sleep interval, and remains in the sleep mode. For example, when the minimum window value is 2, the MS sets the sleep interval to 2 frames, and remains in the sleep mode for the 2 frames. After the 2 frames pass, the MS awakes from the sleep mode and determines if the TRF-IND message has been received. When the TRF-IND message has not been received, i.e., when there is no packet data transmitted from the BS to the MS, the MS sets the sleep interval to be 4 frames, which is twice as many as 2 frames, and remains in the sleep mode for the 4 frames. Accordingly, the sleep interval may increase from the minimum window value to the maximum window value, and an update algorithm for the sleep interval is the sleep interval update algorithm.

Messages defined in the IEEE 802.16e communication system for supporting the sleep mode operation and the awake mode operation as described above will be described herein below.

(1) Sleep Request (SLP-REQ) Message

The SLP-REQ message is transmitted from an MS to a BS, which is a message used when the MS requests a mode transition to a sleep mode. The SLP-REQ message includes parameters, i.e., information elements (IEs), required when the MS operates in the sleep mode. A format of the SLP-REQ message is shown in Table 1.

TABLE 1

| Syntax | Size | Notes |
|---|---|---|
| SLP-REQ__Message__Format ( ) { | | |
| Management message type = 46 | 8 bits | |
| initial-sleep window | 6 bits | |
| final-sleep window | 10 bits | |
| Listening interval | 6 bits | |
| Reserved | 2 bits | |
| } | | |

The SLP-REQ message is a dedicated message transmitted based on a connection ID (CID) of an MS.

The Management message type IE represents the type of message being transmitted. For example, when the Management message type has a value of 45, the transmitted message is the SLP-REQ message.

The initial-sleep window value IE represents a requested start value for the sleep interval (e.g., measured in frames), and the final-sleep window value represents a requested stop value for the sleep interval. That is, as described above for the sleep interval update algorithm, the sleep interval may be updated within a range from the initial-sleep window value to the final-sleep window value.

The listening interval represents a requested listening interval, which may also be expressed by the number of frames.

(2) SLPRSP Message

The SLP-RSP message is a response message for the SLP-REQ message, which can used to indicate whether to approve or deny the mode transition to the sleep mode requested by the MS, or as an unsolicited instruction. The SLP-RSP message includes IEs required when the MS operates in the sleep mode. A format of the SLP-RSP message is shown in Table 2.

TABLE 2

| Syntax | Size | Notes |
|---|---|---|
| SLP-RSP__Message__Format ( ) { | | |
| Management message type = 47 | 8 bits | |
| Sleep-approved | 1 bit | 0: Sleep-mode request denied |

TABLE 2-continued

| Syntax | Size | Notes |
|---|---|---|
| | | 1: Sleep-mode request approved |
| IF (Sleep-approved ==0) { | | |
| After-REQ-action | 1 bit | 0: The MS may retransmit the SLP-REQ message after time duration (REQduration) given by the BS in this message |
| | | 1: The MS shall not retransmit the -SLP-REQ message and shall await the -SLP-RSP message from the BS |
| REQ-duration | 4 bits | Time duration for case where After-REQ-action value is 0 |
| Reserved | 2 bits | |
| } | | |
| Else { | | |
| Start frame | | |
| initial-sleep window | 6 bits | |
| final-sleep window | 10 bits | |
| listening interval | 6 bits | |
| SLPID | 10 bits | |
| } | | |
| } | | |

The SLP-RSP message is a dedicated message transmitted based on a basic CID of the MS.

The Management message type IE represents the type of a message currently being transmitted. For example, when the Management message type has a value of 46, the transmitted message represents the SLP-RSP message.

Further, the Sleep-approved has a value expressed by one bit. When the Sleep-approved has a value of 0, it implies that the request for the mode transition to the sleep mode has been denied (SLEEP-MODE REQUEST DENIED). However, when the Sleep-approved has a value of 1, it implies that the request for the mode transition to the sleep mode has been approved (SLEEP-MODE REQUEST APPROVED). Further, when the Sleep-approved has the value of 0, it implies that the BS has denied the mode transition to the sleep mode requested by the MS.

Accordingly, the MS having experienced the denial transmits the SLP-REQ message to the BS or waits for receiving an SLP-RSP message representing an unsolicited instruction from the BS when the situation requires. When the Sleep-approved has the value of 1, there exist the Start frame value, the initial-sleep window value, the final-sleep window value, the listening interval and the aforementioned SLPID. However, when the Sleep-approved has the value of 0, there exist the After-REQ-action value and the REQ-duration.

The Start frame value represents the number of frames, not including the frame in which the SLP-RSP message has been received, until the MS enters the first sleep interval. That is, the MS transits to the sleep mode after the frames corresponding to the start frame value have passed from a frame directly after the frame in which the SLP-RSP message has been received.

The SLPID is used for differentiating MSs staying in the sleep mode, which allows the total 1024 MSs staying in the sleep mode to be distinguished from one another.

As described above, the initial-sleep window value represents a start value for the sleep interval, which is measured in frames, the listening interval represents a value for a listening interval, and the final-sleep window value represents a stop value for the sleep interval. The After-REQ-action value represents an operation, which must be done by the MS having experienced the denial for the mode transition to the sleep mode.

3) TRF-IND Message

The TRF-IND message is a message transmitted from the BS to the MS during the listening interval, which represents the existence of packet data to be transmitted from the BS to the MS. The TRF-IND message has a format as shown in Table 3.

TABLE 3

| Syntax | Size | Notes |
|---|---|---|
| TRF-IND_Message_Format ( ) { | | |
| Management message type = 48 | 8 bits | |
| SLPID bit-map | Variable | |
| } | | |

The TRF-IND message is a broadcasting message transmitted through the broadcasting scheme, differently from the SLP-REQ message and the SLP-RSP message. The TRF-IND message represents if there is packet data to be transmitted from the BS to a predetermined MS. The MS decodes the broadcasted TRF-IND message during the listening interval and determines whether to transit to an awake mode or to return to the sleep mode again.

When the MS transits to the awake mode, the MS confirms frame sync. When the frame sync does not coincide with a frame sequence number expected by the MS, the MS can request retransmission of packet data lost in the awake mode. When the MS has failed to receive the TRF-IND message during the listening interval or the TRF-IND message having received in the MS does not include a value representing a positive indication, the MS may return to the sleep mode.

The Management message type IE is information representing the type of a message currently being transmitted. For example, when the Management message type has a value of 48, the transmitted message represents the TRF-IND message.

The SLPID bit-map represents a set of indication indices. Each of the indication indices has one bit allocated to one of SLPIDs assigned to MSs in order to identify the MSs, respectively, which have transited to the sleep mode. That is, the SLPID bit-map represents a group of bits, each of which is allocated to an MS in the SLPID values (with a maximum value of '-1') assigned to the MSs currently staying in the sleep mode. The SLPID bit-map may be allocated a dummy bit for a byte alignment.

A bit allocated to the MS represents if there is packet data to be transmitted from the BS to a corresponding MS. Further, the MS in the sleep mode reads an SLPID and a mapped bit in the TRF-IND message received during the listening interval, which have been allocated in the mode transition to the sleep mode. If the allocated bit has a positive indication value, i.e., 1, the MS continuously maintains the awake mode. As a result, the MS transits to the awake mode. However, if the allocated bit has a negative indication value, i.e., 0, the MS transits to the sleep mode again.

FIG. 3 is a flow diagram schematically illustrating a conventional ranging process in the IEEE 802.16e communication system. Referring to FIG. 3, the MS 300 is powered on, monitors all frequency bands having been already set in the MS 300, and detects a reference signal, e.g., a pilot signal, having the highest Carrier-to-Interference and Noise-Ratio (CINR). The MS 300 determines a BS 320 having transmitted the pilot signal having the highest CINR as the BS 320 (or serving BS 320) to which the MS 300 currently belongs. The MS 300 receives the preamble of the downlink frame transmitted from the serving BS 320 and acquires system synchronization with the BS 320.

As described above, when the system synchronization is acquired between the MS 300 and the serving BS 320, the serving BS 320 transmits a DownLink (DL)-MAP message and an Uplink (UL)-MAP message to the MS 300 in steps 311 and 313. The DL-MAP message has a format as shown in Table 4.

TABLE 4

| Syntax | Size | Notes |
| --- | --- | --- |
| DL-MAP_Message_Format( ) { | | |
| Management Message Type=2 | 8 bits | |
| PHY Synchronization Field | Variable | See Appropriate PHY specification |
| DCD Count | 8 bits | |
| Base Station ID | 48 bits | |
| Number of DL-MAP Element n | 16 bits | |
| Begin PHY specific section { | | See Applicable PHY section |
| For (i=1; i<=n; i++) | | For each DL-MAP element 1 to n |
| DL-MAP Information Element( ) | Variable | See corresponding PHY specification |
| If!(byte boundary) { | 4 bits | Padding to reach byte boundary |
| Padding Nibble | | |
| } | | |
| } | | |
| } | | |
| } | | |

As shown in Table 4, the DL-MAP message includes a plurality of IEs, that is, the Management Message Type representing the type of a transmitted message, the PHYsical (PHY) Synchronization set according to a modulation scheme and a demodulation scheme applied to a physical channel in order to acquire synchronization, the DCD count representing a count corresponding to the configuration variation of a Downlink Channel Descriptor (DCD) message including a downlink bust profile, the Base Station ID representing a Base Station identifier, and the 'Number of DL-MAP Elements n' representing the number of elements existing after the Base Station ID. In particular, the DL-MAP message includes information for ranging codes allocated to each ranging in an OFDMA communication system. The MS 300 may detect information for downlink bursts included in the downlink frame through the DL-MAP message. Accordingly, the MS 300 may receive data, that is, data frames, in the burst by differentiating the downlink bursts of the downlink frame.

The UL-MAP message has a format as shown in Table 5.

TABLE 5

| Syntax | Size | Notes |
| --- | --- | --- |
| UL-MAP_Message_Format( ) { | | |
| Management Message Type=3 | 8 bits | |
| Uplink Channel ID | 8 bits | |
| UCD Count | 8 bits | |
| Number of UL-MAP Element n | 16 bits | |
| Allocation Start Time | 32 bits | |
| Begin PHY specific section { | | See Applicable PHY section |
| for (i=1; i<=n; i++) | | For each UL-MAP element 1 to n |

TABLE 5-continued

| Syntax | Size | Notes |
| --- | --- | --- |
| UL-MAP_Information_Element( ) | Variable | See corresponding PHY specification |
| } | | |
| } | | |
| } | | |

As shown in Table 5, the UL-MAP message includes a plurality of IEs, that is, the Management Message Type representing the type of a transmitted message, the Uplink Channel ID representing a used uplink channel identifier, the UCD count representing a count corresponding to the configuration variation of an Uplink Channel Descriptor (UCD) message including an uplink bust profile, and the 'Number of UL-MAP Elements n' representing the number of elements existing after the UCD count. The uplink channel identifier is uniquely allocated by a Medium Access Control (MAC) sublayer.

The MS 300 having synchronized with the BS 320, i.e., the MS 300 having recognized downlink and uplink control information and actual data transmission/reception locations, transmits a Ranging Request (RNG-REQ) message to the BS 320 in step 315. The BS 320 having received the RNG-REQ message transmits a Ranging Response (RNG-RSP) message, which includes information for compensating for a frequency, a time and transmit power for the ranging, to the MS 300 in step 317.

In FIG. 3, for convenience of description, the ranging process is ended through one-time RNG-REQ message transmission process and one-time RNG-RSP message transmission process corresponding to the RNG-REQ message transmission. However, according to the actual ranging process, the RNG-REQ message transmission process and the RNG-RSP message transmission process corresponding to the RNG-REQ message transmission may be repeated several times until the transmit power/timing/frequency compensation for the uplink is completed. The ranging process is periodically performed.

The RNG-REQ message has a format as shown in Table 6.

TABLE 6

| Syntax | Size | Notes |
| --- | --- | --- |
| RNG-REQ_message_Format( ) { | | |
| Management Message Type=4 | 8 bits | |
| Downlink Channel ID | 8 bits | |
| Pending Until Complete | 8 bits | |
| TLV Encoded Information | Variable | TLV specific |
| } | | |

As shown in Table 6, the RNG-REQ message includes a plurality of IEs, that is, the Management Message Type representing the type of a transmitted message, the Downlink Channel ID representing a downlink channel identifier included in the RNG-REQ message received in the MS 300 through the UCD message, and the Pending Until Complete representing a priority of a transmitted ranging response. The Pending Until Complete has a value of 8 bits. When the Pending Until Complete has a value of '00000000', the previous ranging response has a high priority. However, when the Pending Until Complete does not have the value of '00000000', the current ranging response has a high priority.

The RNG-RSP message has a format as shown in Table 7.

TABLE 7

| Syntax | Size | Notes |
| --- | --- | --- |
| RNG-RSP_message_Format( ) { | | |
| Management Message Type=5 | 8 bits | |
| Uplink Channel ID | 8 bits | |
| TLV Encoded Information | Variable | TLV specific |
| } | | |

As shown in Table 7, the RNG-RSP message includes a plurality of IEs, that is, the Management Message Type representing the type of a transmitted message, and the Uplink Channel ID representing an uplink channel identifier included in the RNG-REQ message.

The completion of the transmission/reception operations of the RNG-REQ message and the RNG-RSP message, i.e., the completion of the ranging process, may be determined by a Ranging Status parameter value of the TLV (Type, Length, and Value) Encoded Information as shown in Table 7. The Ranging Status parameter has one of the values as shown in Table 8.

TABLE 8

| Value of Ranging Status | Meaning |
| --- | --- |
| 1 | Continue |
| 2 | Abort |
| 3 | Success |
| 4 | Re-Range |

The ranging process is performed through at least one-time exchange of the RNG-REQ message and the RNG-RSP message as described above. More specifically, the exchange of the RNG-REQ message and the RNG-RSP message may be repeated until the transmit power/timing/frequency compensation is completed. Further, the exchange of the RNG-REQ message and the RNG-RSP message of more than twice is controlled by the value of the Ranging Status in the RNG-RSP message transmitted from the BS.

When the Ranging Status in the RNG-RSP message transmitted from the BS has a value of 1, the MS determines that it is necessary to additionally exchange the RNG-REQ message and the RNG-RSP message. More specifically, the MS determines that the ranging process continues, performs the transmit power/timing/frequency compensation with the BS, and then transmits the RNG-REQ message to the BS. The BS having received the RNG-REQ message from the MS sets the Ranging Status of the RNG-RSP message to have a value of 1 again when an additional compensation is required according to status of the transmit power/timing/frequency compensation by the MS. The BS transmits the RNG-RSP message to the MS and enables an additional exchange the RNG-REQ message and the RNG-RSP message to be performed.

However, when the additional compensation is not required according to the status of the transmit power/timing/frequency compensation by the MS, i.e., the ranging process has succeeded, the BS sets the Ranging Status of the RNG-RSP message to have a value of 3 and prevents the RNG-REQ message and the RNG-RSP message from being additionally exchanged.

Hereinafter, the ranging will be described in detail.

The ranging may be classified into an initial ranging, a maintenance ranging, i.e., a periodic ranging, and a bandwidth request ranging. The MS may compensate for the transmit power through the ranging operation before transmitting data through an uplink, and may compensate for the timing offset and the frequency offset.

First, the initial ranging will be described.

The initial ranging is performed when a BS acquires synchronization with an MS, which represents a ranging performed in order to match the exact time offset between the MS and the BS and compensate for the transmit power. That is, the MS is powered on, receives a DL-MAP message and an UL-MAP message, and acquires synchronization with the BS. The MS performs the initial ranging to compensate for the time offset and the transmit power with the BS.

Second, the periodic ranging will be described.

The periodic ranging is performed when the MS having compensated for the time offset and the transmit power with the BS through the initial ranging compensates for channel conditions, etc., with the BS.

Third, the bandwidth request ranging will be described.

The bandwidth request ranging is performed when the MS having compensated for the time offset and the transmit power with the BS through the initial ranging requests a bandwidth allocation in order to actually perform communication with the BS.

As described above, because the IEEE 802.16e communication system accommodates the mobility of the MS, the periodic ranging of the MS becomes a vital factor for data transmission/reception. According to the periodic ranging, which is an operation for measurement and compensation of parameters required when the MS performs reliable communication with the BS, the BS must allocate uplink resources so that the MS can perform the periodic ranging, i.e., the MS can transmit an RNG-REQ message to the BS. More specifically, the BS must allocate the uplink resources to the MS for the periodic ranging of the MS and notifies information for allocation of the uplink resources of the MS through the UL-MAP message.

Thereafter, the MS transmits the RNG-REQ message to the BS through the allocated uplink resources and performs the periodic ranging operation with the BS. The BS compensates for the transmit power, timing offset, and frequency offset according to the RNG-REQ message received from the MS and transmits the RNG-RSP message to the MS in response to the RNG-REQ message, thereby ending the periodic ranging.

However, because the sleep mode operation and the ranging operation, particularly, the periodic ranging operation, have been proposed to operate independently from each other in the IEEE 802.16e communication system, the sleep mode operation and the periodic ranging operation do not have a correlation between themselves. That is, even an MS staying in the sleep mode must perform the periodic ranging in order to perform reliable communication with the BS. However, because the MS staying in the sleep mode cannot receive a message transmitted from the BS, it is impossible to receive resources for the periodic ranging. Accordingly, it is necessary to propose a scheme for the periodic ranging of the MS staying in the sleep mode.

SUMMARY OF THE INVENTION

Accordingly, the present invention has been designed to solve the above and other problems occurring in the prior art. An object of the present invention is to provide a system and a method for performing a periodic ranging in a sleep mode of a BWA communication system.

In order to accomplish the aforementioned object, according to an aspect of the present, there is provided a method for performing a periodic ranging by a receiver in a sleep mode of a wireless communication system. The method includes the steps of: receiving a sleep mode transition message including first information relating to a timing point at which the periodic ranging is performed; and transiting to the sleep mode after receiving the sleep mode transition message and performing the periodic ranging at a timing point corresponding to the first information.

According to another aspect of the present, there is provided a method for performing a periodic ranging by a transmitter in a sleep mode of a wireless communication system. The method includes the steps of: transmitting a sleep mode transition message including first information relating to a timing point at which the periodic ranging is performed; and performing the periodic ranging at a timing point corresponding to the first information after transmitting the sleep mode transition message.

According to further another aspect of the present, there is provided a system for performing a periodic ranging in a sleep mode of a wireless communication system. The system includes: a transmitter for transmitting a sleep mode transition message including first information relating to a timing point at which the periodic ranging is performed; and a receiver for transiting to the sleep mode when the sleep mode transition message is received and performing the periodic ranging at a timing point corresponding to the first information.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
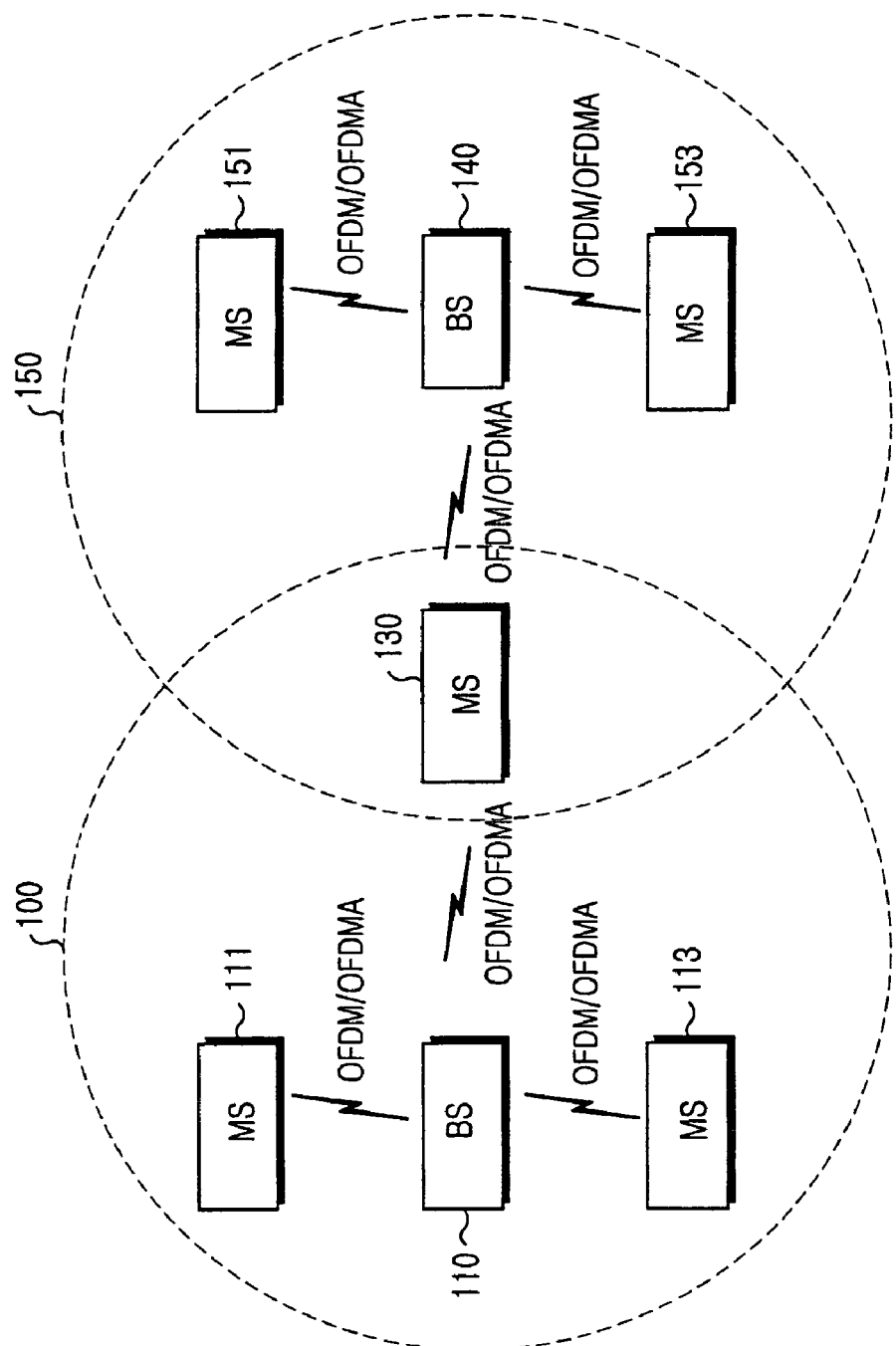
FIG. 1 is a block diagram illustrating a conventional structure of an IEEE 802.16e communication system.
Figure 2:
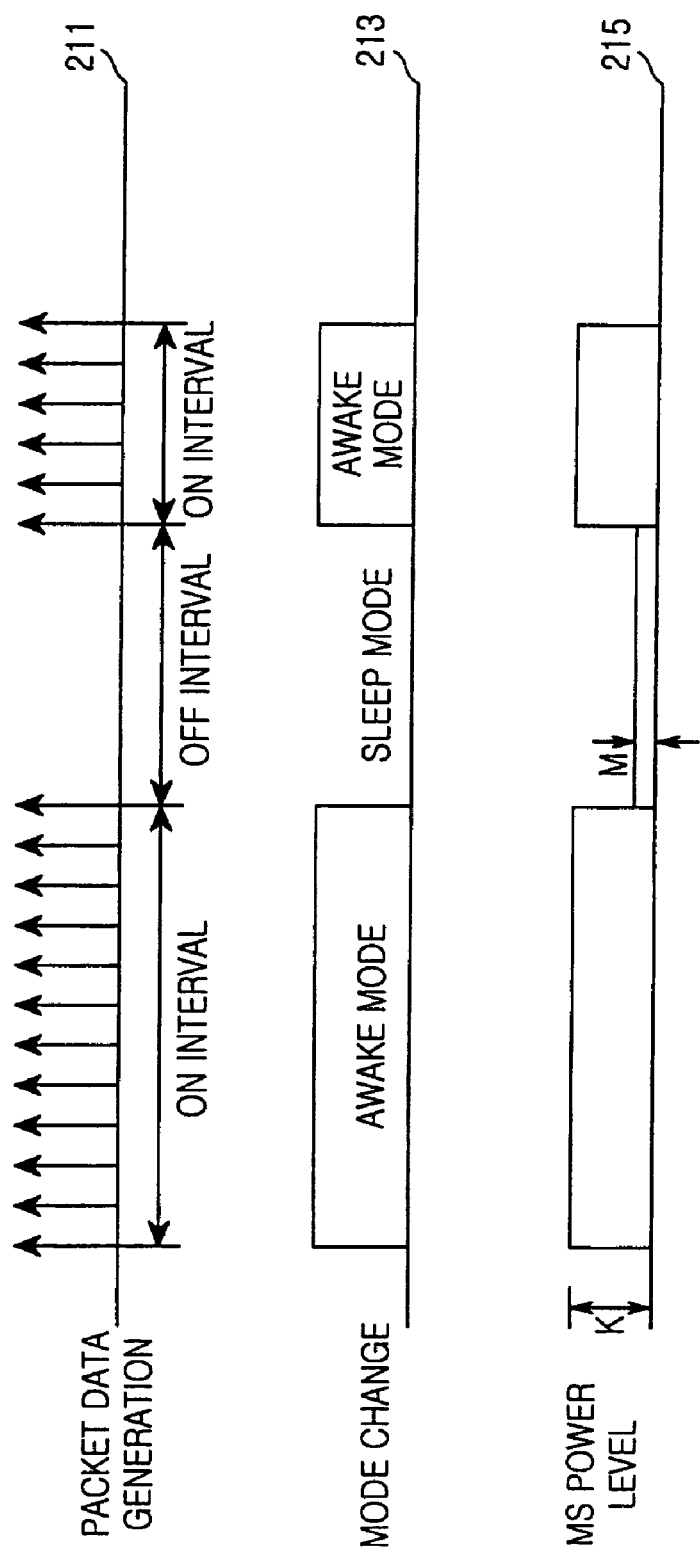
FIG. 2 is a diagram schematically illustrating a conventional sleep mode operation in an IEEE 802.16e communication system.
Figure 3:
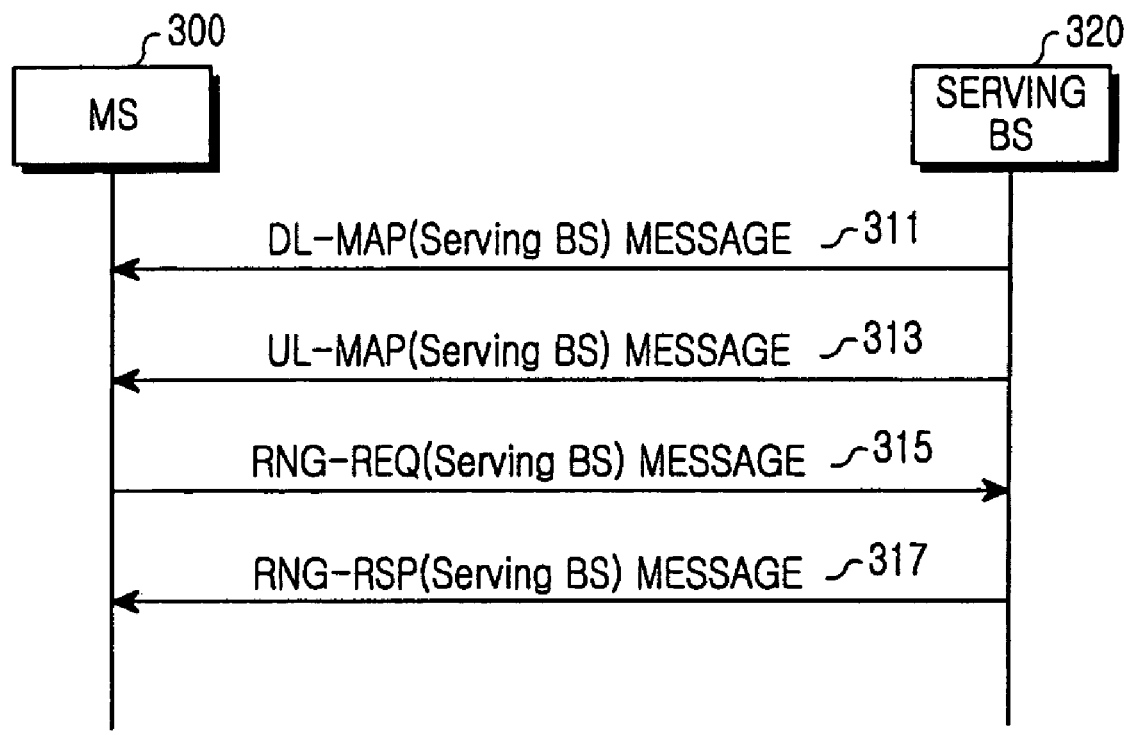
FIG. 3 is a flow diagram schematically illustrating a conventional ranging process in an IEEE 802.16e communication system.

Preferred embodiments of the present invention will be described in detail herein below with reference to the accompanying drawings. In the following description, a detailed description of known functions and configurations incorporated herein will be omitted when it may obscure the subject matter of the present invention.

The present invention proposes a periodic ranging scheme for a Mobile Station (MS) that remains in a sleep mode of an Institute of Electrical and Electronics Engineers (IEEE) 802.16e communication system, which is a Broadband Wireless Access (BWA) communication system. That is, the present invention allocates uplink sources for a periodic ranging, even to the MS staying in the sleep mode, thereby proposing a scheme that enables the MS to perform the periodic ranging in the sleep mode and perform reliable communication.

The IEEE 802.16e communication system is a BWA communication system using an Orthogonal Frequency Division Multiplexing (OFDM) scheme and an Orthogonal Frequency Division Multiple Access (OFDMA) scheme. In addition, the IEEE 802.16e communication system is a communication system capable of transmitting data at a high speed by transmitting physical channel signals through multiple sub-carriers and accommodating the mobility of an MS by supporting a multi-cell structure. The present invention utilizes the IEEE 802.16e communication system as one example, but it is apparent to those who skilled in the art that the present invention can be applied to all communication systems supporting a sleep mode operation and a periodic ranging operation.

Messages for supporting the periodic ranging operation in the sleep mode of the present invention will be descried herein below.

(1) Sleep-Response (SLP-RSP) Message

As described in the prior art, the SLP-RSP message is a response message for a Sleep-Request (SLP-REQ) message. However, the present invention uses a new SLP-RSP message obtained by adding a predetermined field to an existing SLP-RSP message used in the IEEE 802.16e communication system. The SLP-RSP message proposed by the present invention has a format as shown in Table 9.

TABLE 9

| Syntax | Size | Notes |
|---|---|---|
| SLP-RSP_Message_Format ( ) { | | |
| Management message type = 47 | 8 bits | |
| Sleep-approved | 1 bit | 0: Sleep-mode request denied<br>1: Sleep-mode request approved |
| IF (Sleep-approved ==0) { | | |
| After-REQ-action | 1 bit | 0: The MS may retransmit the SLP-REQ message after time duration (REQduration) given by the BS in this message<br>1: The MS shall not retransmit the SLP-REQ message and shall await the SLP-RSP message from the BS |
| REQ-duration | 4 bits | Time duration for case where After-REQ-action value is 0 |
| reserved | 2 bits | |
| } | | |
| else { | | |
| Start frame | | |
| initial-sleep window | 6 bits | |
| final-sleep window | 10 bits | |
| listening interval | 6 bits | |
| SLPID | 10 bits | |
| Next Periodic Ranging | 24 bits | [Frame] |
| } | | |
| } | | |

The SLP-RSP message is a dedicated message transmitted based on a basic connection ID(CID) of the MS. The SLP- RSP message shown in table 9 has the same Information Elements(IEs) as those of the SLP-RSP message of table 2 described in the prior art, i.e., those of the conventional SLP-RSP message used in the IEEE 802.16e communication system, except for the Next Periodic Ranging. Accordingly, the detained description for the same IEs will be omitted.

The Next Periodic Ranging is an IE representing the frame number at which an MS must transit back to the awake mode, after transiting into the sleep mode from the awake mode, in order to perform the periodic ranging, i.e., in order to receive an uplink burst from the base station. More specifically, when the MS arrives at the frame number corresponding to the Next Periodic Ranging IE during a sleep interval, the MS must transit from the sleep mode to the awake mode in order to perform the periodic ranging.

As described above, the Next Periodic Ranging IE informs the MS in the sleep mode of a point in time at which the MS is to transit to the awake mode. Accordingly, the Next Periodic Ranging IE may indicate the frame number at which the MS in the sleep mode must transit to the awake mode or the frame offset until the MS transits to the awake mode from the current point in time, i.e., the current frame.

When the Next Periodic Ranging IE indicates the frame number at which the MS staying in the sleep mode is to transit to the awake mode, the frame number is expressed by an absolute value. Further, when the Next Periodic Ranging IE indicates the frame offset until the MS staying in the sleep mode transits to the awake mode, it is noted that the frame offset is only a relative value of frame number. So, they have the same meaning.

Accordingly, when the Next Periodic Ranging IE indicates the frame offset until the MS staying in the sleep mode transits to the awake mode, the MS adds a value indicated by the Next Periodic Ranging IE to a frame number at which the SLP-RSP message has been received, thereby calculating the frame number at which the MS must transit to the awake mode. It is apparent that whether the Next Periodic Ranging IE indicates the frame number, i.e., absolute value, in which the MS is to transit to the awake mode or the frame offset, i.e., relative value, up to a frame in which the MS is to transit to the awake mode may be adaptively determined according to a variety of circumstances in IEEE 802.16e communication system.

Further, the Next Periodic Ranging IE may be inserted into the SLP-RSP message as an essential IE as shown in table 9 or as an optional IE by means of a TLV (Type, Length, Value) encoding scheme, etc.

When the MS has already stayed in the awake mode, the MS only has to perform the periodic ranging in a frame having a frame number corresponding to the Next Periodic Ranging IE. When the MS still remains in the sleep mode, even after performing the periodic ranging, the MS may transit from the awake mode to the sleep mode again.

(2) Ranging-Response(RNG-RSP) Message

As described in the prior art, the RNG-RSP message is a response message for a Ranging-Request(RNG-REQ) message. However, the present invention uses a new RNG-RSP message that is obtained by adding the Next Periodic Ranging IE as described in table 9 to a TLV Encoded Information field of an existing RNG-RSP message used in the IEEE 802.16e communication system. The RNG-RSP message of the present invention has the same IEs as those of the conventional RNG-RSP message used in the IEEE 802.16e communication system as described in Table 7, except for the Next Periodic Ranging IE. Accordingly, the detailed description for the same IEs will be omitted. The Next Periodic Ranging IE added to the TLV Encoding parameter of the RNG-RSP message is shown in Table 10.

TABLE 10

| Type | Length | Value | Scope |
| --- | --- | --- | --- |
| 14 | 3 | Frame number for MS to awake for Periodic Ranging Operation | |

As shown in Table 10, because the Next Periodic Ranging IE is a TLV Encoding type parameter, it is inserted into the RNG-RSP message and transmitted to the MS, only when the situation requires. That is, when the Ranging Status as described in table 8 of the prior art, from among the parameters of the RNG-RSP message, has been set to have a value of 3(success) in a point in time at which the periodic ranging is completed, a BS inserts the Next Periodic Ranging IE into the RNG-RSP message and transmits the RNG-RSP message to the MS. The MS having received the RNG-RSP message including the Next Periodic Ranging IE is aware of the completion of the periodic ranging operation, and detects the Next Periodic Ranging IE included in the RNG-RSP message in order to identify a frame in which the next periodic ranging starts.

In table 10, the Next Periodic Ranging IE has indicated the frame number, i.e., absolute value, in which the MS is to transit to the awake mode. However, it is apparent that whether the Next Periodic Ranging IE indicates the frame offset, i.e., relative value, up to the frame in which the MS is to transit to the awake mode as described in table 9 may be adaptively determined according to a variety of circumstances in IEEE 802.16e communication system.

When the MS stays in a sleep interval, after the periodic ranging operation has been completed, the MS may transit from the awake mode to the sleep mode again. Thereafter, the MS performs the periodic ranging according to the Next Periodic Ranging IE detected from the RNG-RSP message. When the MS stays in the sleep mode when the periodic ranging is performed, the MS transits to the awake mode and performs the periodic ranging operation. However, when the MS stays in the awake mode, the MS performs the periodic ranging operation in the awake mode.

Figure 4:
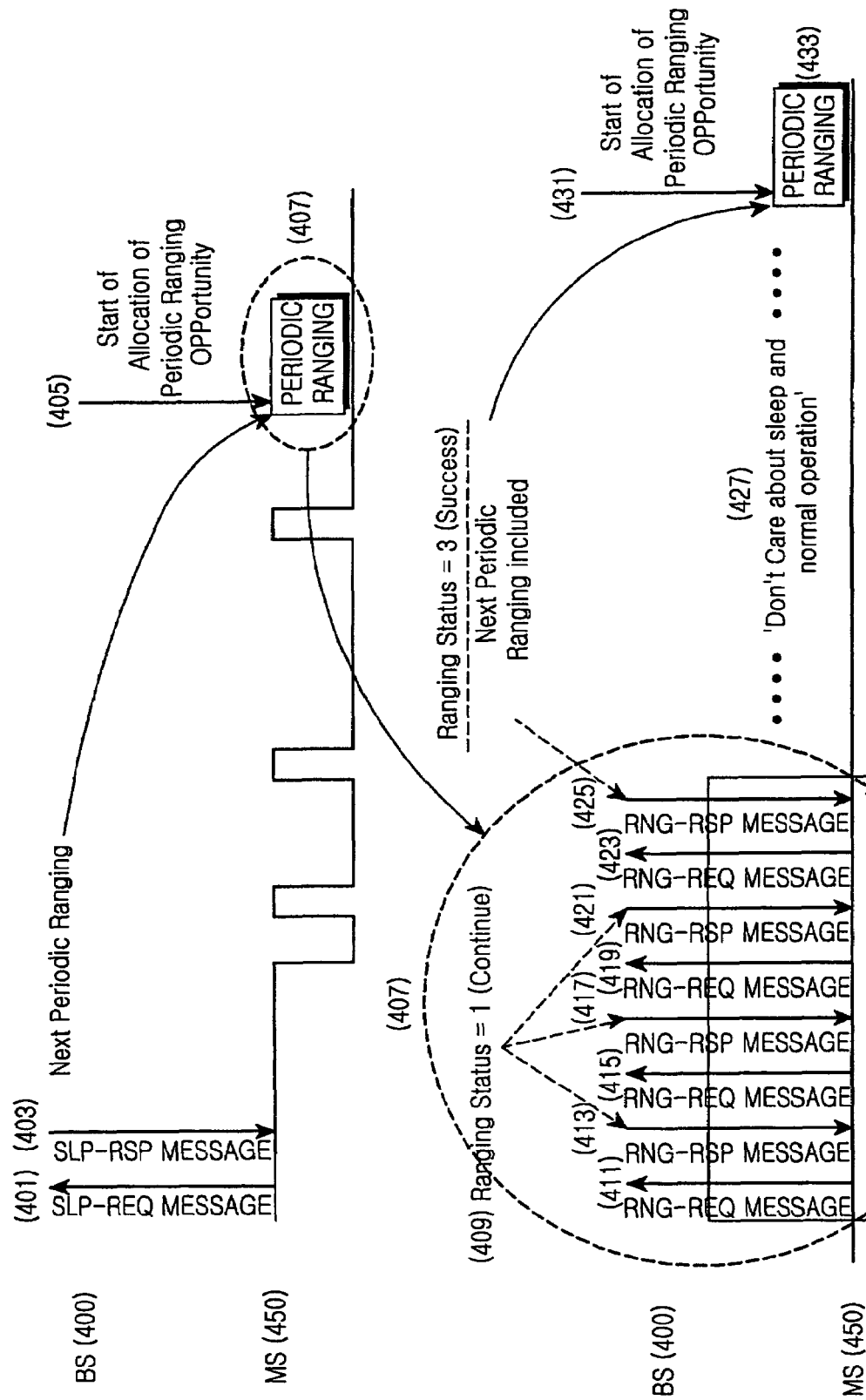
FIG. 4 is a diagram schematically illustrating a periodic ranging operation of an MS staying in the sleep mode in an IEEE 802.16e communication system according to an embodiment of the present invention.

FIG. 4 is a diagram schematically illustrating a periodic ranging operation of an MS that remains in the sleep mode in the IEEE 802.16e communication system according to an embodiment of the present invention. Referring to FIG. 4, the MS 450 transmits an SLP-REQ message to a BS 400 in order to transit from an awake mode to the sleep mode in step 401. Because the SLP-REQ message is the same as that described in Table 1 of the prior art, the detailed description will be omitted here.

The BS 400 having received the SLP-REQ message from the MS 450 determines whether to approve a mode transition to the sleep mode of the MS 450 based on circumstances of the BS 400 and the MS 450. As a result of the determination, the BS 400 transmits an SLP-RSP message to the MS 450 in step 403. The SLP-RSP message includes the IEs as described in Table 9, including the Next Periodic Ranging IE newly proposed by the present invention.

When the MS 450 receives the SLP-RSP message from the BS 400, the MS 450 detects the Next Periodic Ranging IE included in the SLP-RSP message and prepares for the periodic ranging operation according to the Next Periodic Ranging IE.

As described in the prior art, the MS 450 performs a conventional sleep mode operation in the IEEE 802.16e communication system while increasing a sleep interval through a sleep interval update algorithm. When the MS 450 has arrived at a frame in which the periodic ranging must be performed in the sleep mode, i.e., when the MS 450 has arrived at a frame corresponding to the Next Periodic Ranging IE, the MS 450 staying in the sleep mode transits to an awake mode in step 405. The MS 450 must perform the periodic ranging operation in the awake mode in step 407.

The periodic ranging operation is performed through at least one-time exchange of the RNG-REQ message and the RNG-RSP message in steps 411, 413, 415, 417, 419, 421, 423, and 425. When the MS 450 receives an uplink burst for a periodic ranging corresponding to the Next Periodic Ranging IE from the BS 400 in step 405, the MS 450 transmits the RNG-REQ message to the BS 400 through the received uplink burst in step 411. The BS 400 having received the RNG-REQ message transmits the RNG-RSP message including ranging response information to the MS 450 in step 413. The ranging response information includes information regarding the frequency, time, and transmit power, which must be compensated by the MS 450 through the RNG-REQ message. When it is necessary to additionally compensate for the frequency, time, and transmit power, the BS 400 sets the Ranging Status of the RNG-RSP message to have a value of 1, which indicates that the ranging process continues.

The MS 450 having received the RNG-RSP message including the Ranging Status having the value of 1 detects parameters required for compensating for the frequency, time, and transmit power from the RNG-RSP message. The MS 450 compensates for the frequency, time, and transmit power. Further, the MS 450 transmits the RNG-REQ message to the BS 400 in order to continuously perform the unfinished compensation for the frequency, time, and transmit power in step 415.

The BS 400 having received the RNG-REQ message from the MS 450 performs the periodic ranging operation while repeating the exchange of the RNG-REQ message and the RNG-RSP message as described above, in steps 417, 419, 421, and 423. When the BS 400 determines that the compensation for the frequency, time, and transmit power by the MS 450 is not necessary any more, the BS 400 sets the Ranging Status of the RNG-RSP message, which corresponds to the RNG-REQ message received from the MS 450, to have a value of 3 to indicate that the ranging process has succeed. Further, the BS 400 adds the Next Periodic Ranging IE representing a frame in which the next periodic ranging must be performed to the RNG-RSP message, and transmits the RNG-RSP message to the MS 450 in step 425.

The MS 450 having received the RNG-RSP message including the Next Periodic Ranging IE and the Ranging Status having the value of 3 identifies the completion of the periodic ranging, and prepares to perform a periodic ranging in the frame corresponding to the Next Periodic Ranging IE. When the MS 450 remains in the sleep interval in a state in which the periodic ranging has been completed, the MS 450 may transit from the awake mode to the sleep mode.

When the MS 450 remains in the sleep mode in the frame corresponding to the Next Periodic Ranging IE, the MS 450 transits from the sleep mode to the awake mode and performs the periodic ranging operation. However, when the MS 450 stays in the awake mode, the MS 450 performs the periodic ranging operation in the awake mode.

More specifically, when the MS 450 stays in the awake mode at a point in time at which the periodic ranging operation starts, the MS 450 must decode the DL-MAP message or the UL-MAP message as described in Tables 4 or 5, in order to understand if a data burst for the MS 450 exists in a downlink frame. When the MS 450 understands that the BS 400 has allocated a Periodic Ranging Opportunity, i.e., an uplink burst, for the periodic ranging to the MS 450 in the course of decoding the DL-MAP message and the UL-MAP message, the MS 450 recognizes the Periodic Ranging Opportunity allocated by the BS 400.

When the MS 450 stays in the sleep mode at the point in time at which the periodic ranging operation starts, the MS 450 transits to the awake mode at the point in time at which the periodic ranging operation starts and must decode the DL-MAP message or the UL-MAP message in order to recognize the Periodic Ranging Opportunity allocated by the BS 400.

Accordingly, the Next Periodic Ranging IE proposed by the present invention is applied regardless of the sleep mode or the awake mode of the MS 450, before the point in time at which the periodic ranging operation is performed or at the point in time at which the periodic ranging operation starts in step 427. That is, the periodic ranging operation in the sleep mode proposed by the present invention maintains compatibility with the general IEEE 802.16e communication system as much as possible and can be taken into consideration together with the sleep mode.

Further, the MS 450 must recalculate a frame in which the MS 450 is to transit to the awake mode according to the most recent Next Periodic Ranging IE received through the SLP-RSP message or the RNG-RSP message. For example, when the MS 450 transits to the sleep mode, after transiting to the awake mode during the operation in step 427, the MS 450 must recalculate a frame in which the MS 450 is to transit to the awake mode again, in order to perform the periodic ranging using the Next Periodic Ranging IE of the SLP-RSP message received in the MS 450.

Figure 5:
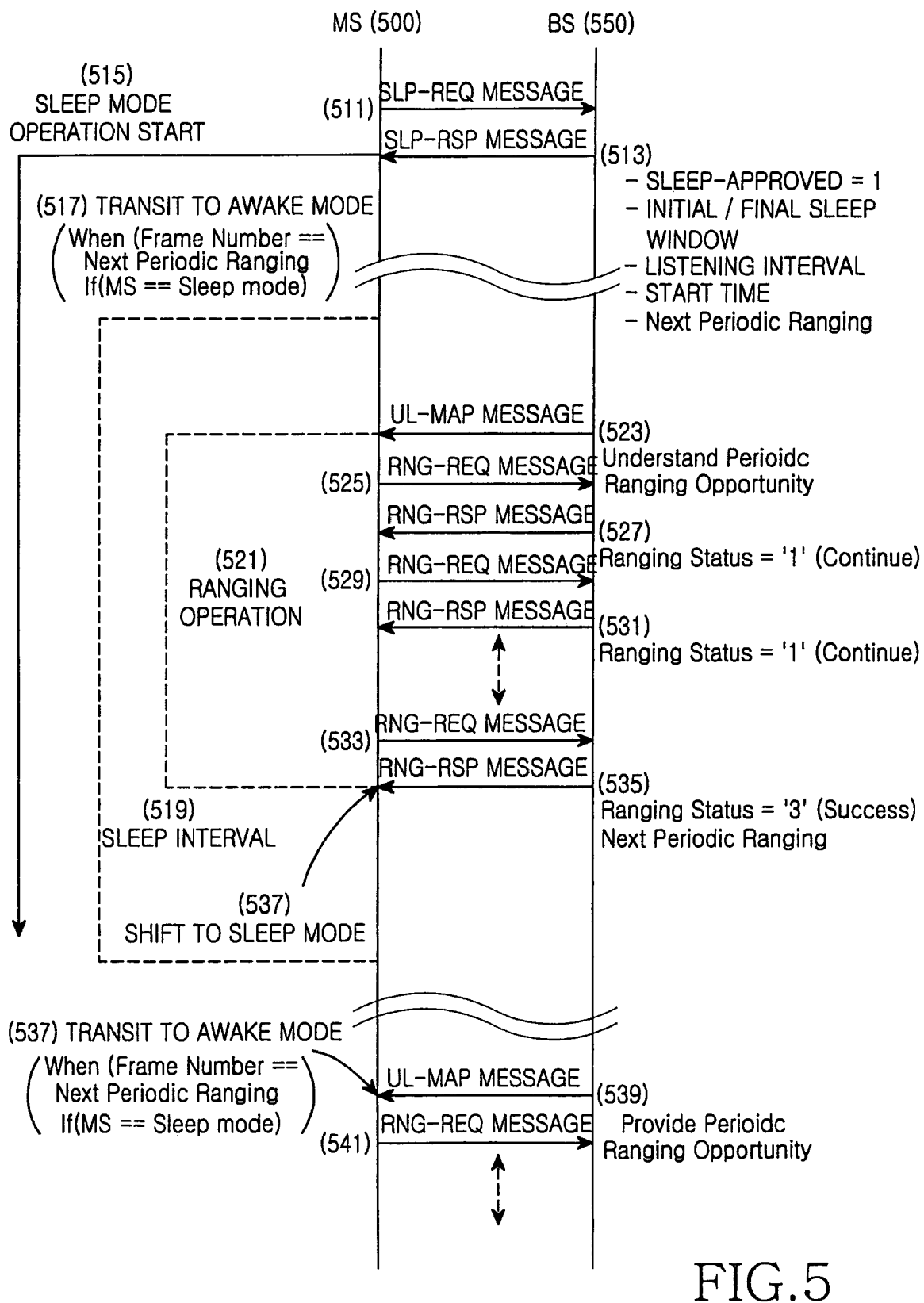
FIG. 5 is a flow diagram illustrating a message exchange operation between an MS and a BS based on a periodic ranging operation of the MS staying in a sleep mode in an IEEE 802.16e communication system according to an embodiment of the present invention.

FIG. 5 is a flow diagram illustrating a message exchange operation between an MS and a BS, based on the periodic ranging operation of the MS staying in the sleep mode in the IEEE 802.16e communication system according to the embodiment of the present invention. Referring to FIG. 5, when the MS 500 staying in the awake mode attempts to transit to the sleep mode, the MS 500 transmits the SLP-REQ message to the BS 550 in step 511. The BS 550 having received the SLP-REQ message determines whether to approve a mode transition to the sleep mode of the MS 500, based on the circumstances of the BS 550 and the MS 500. As a result of the determination, the BS 550 transmits the SLP-RSP message the MS 500 in step 513. The SLP-RSP message includes the IEs as described in Table 9, particularly, the Next Periodic Ranging IE. The MS 500 having received the SLP-RSP message from the BS 550 starts a sleep mode operation according to the SLP-RSP message in step 515. Further, the MS 500 detects a point in time at which the periodic ranging operation is to be performed from the Next Periodic Ranging IE from the SLP-RSP message.

When the MS 500 arrives at a frame corresponding to the Next Periodic Ranging IE while the MS 500 operates in the sleep mode, the MS 500 transits from the sleep mode to an awake mode in order to perform the periodic ranging operation with the BS 550 in step 517. Further, the MS 500 identifies the Periodic Ranging Opportunity, i.e., an uplink burst, which has been allocated to the MS 500, through an UL-MAP message broadcasted from the BS 550 in step 523. The MS 500 transmits an RNG-REQ message to the BS 550 through the uplink burst detected from the UL-MAP message in step 525.

The BS 550, having received the RNG-REQ message from the MS 500, transmits an RNG-RSP message including information, which is required for compensating for a frequency, a time, and transmit power by the MS 500, to the MS 500 in response to the RNG-REQ message in step 527. When the BS 550 determines that it is necessary to additionally compensate for the frequency, time, and transmit power by the MS 500, the BS 550 sets the Ranging Status of the RNG-RSP message to have a value of 1 (continue) and transmits the RNG-RSP message to the MS 500.

After receiving the RNG-RSP message including the Ranging Status having the value of 1, the MS 500 determines that the periodic ranging has not ended, i.e., is in progress, and transmits the RNG-REQ message to the BS 550 in step 529. Because the exchange operations in steps 531 and 533 of the RNG-REQ message and the RNG-RSP message after step 529 are the same as steps 525 and 527, the detailed description will be omitted here.

When the BS 550 determines that it is not necessary to compensate for the frequency, time, and transmit power by the MS500, during the periodic ranging operation, through the exchange of the RNG-REQ message and the RNG-RSP message as described above, i.e., when the BS 550 determines that it is necessary to end the periodic ranging operation, the BS 550 transmits the RNG-RSP message to the MS 500 in step 535, which includes the Next Periodic Ranging IE and the Ranging Status having a value of 3 (success).

The MS 500 understands the ending of the periodic ranging operation by receiving the RNG-RSP message including the Next Periodic Ranging IE and the Ranging Status having the value of 3. When the MS 500 stays in a sleep interval 519, even after the periodic ranging operation has been completed, the MS 500 transits from the awake mode to the sleep mode again in step 537.

When the MS 500 arrives at a frame calculated corresponding to the Next Periodic Ranging IE received through the RNG-RSP message, the MS 500 transits from the sleep mode to the awake mode again in step 537. Herein, when the MS 500 stays in the awake mode instead of the sleep mode, the MS 500 performs the periodic ranging operation in the frame calculated corresponding to the Next Periodic Ranging IE. Because operations after steps 539 and 541 in FIG. 5 are the same as the periodic ranging operation as described above, the detailed description will be omitted here.

Figure 6:
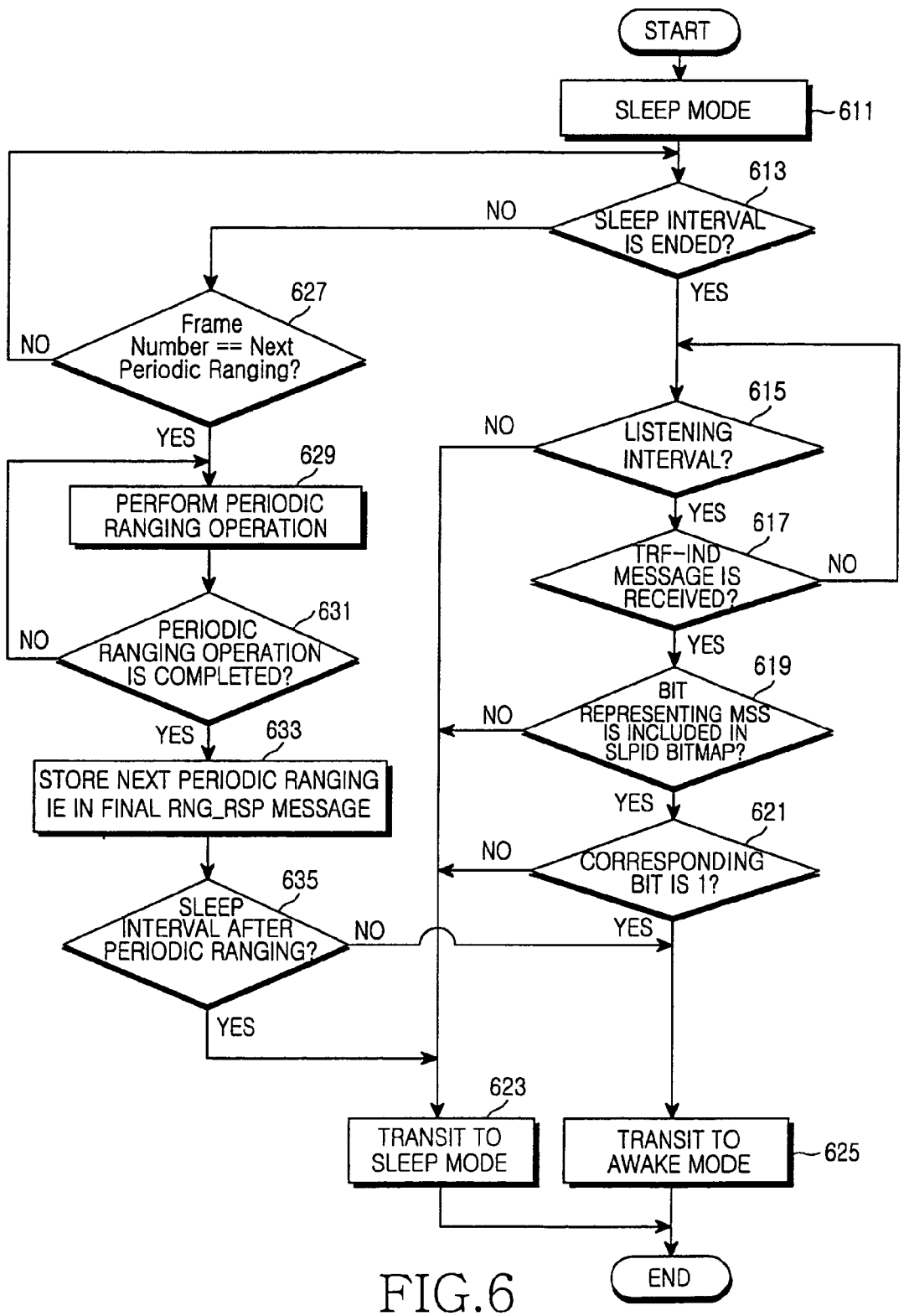
FIG. 6 is a flow diagram illustrating an operation process of an MS according to an embodiment of the present invention.

FIG. 6 is a flow diagram illustrating an operation process of an MS according to an embodiment of the present invention. Referring to FIG. 6, the MS operating in a sleep mode in step 611 determines if a sleep interval has ended in step 613. When the sleep interval has ended, the MS determines if the current is a listening interval in step 615.

When the current interval is not the listening interval, step 623 is performed. However, when the current interval is the listening interval, in step 617, the MS determines if a traffic indication (TRF-IND) message has been received from a BS. When the TRF-IND message has not been received from the BS, the MS returns to step 615.

When the TRF-IND message has been received from the BS, the MS determines if a bit representing the MS has been included in an SLPID bitmap of the TRF-IND message received from the BS in step 619. When the bit representing the MS has not been included in the SLPID bitmap, step 623 is performed.

When the bit representing the MS has been included in the SLPID bitmap, the MS determines if the bit representing the MS has a value implying a positive indication, i.e., 1, in step 621. When the bit representing the MSS does not have the value of 1, i.e., the bit representing the MS has a value implying a negative indication, e.g., 0, step 623 is performed.

In step 623, the MS transits to the sleep mode again and then the procedure ends. However, when the bit representing the MS has the value of 1, step 625 is performed. Because the bit representing the MS has the value of 1 indicates that a transmitted message targeting the MS exists, the MS transits to the awake mode in step 625. Thereafter, the procedure ends.

As a result of the determination in step 613, when the sleep interval has not ended, the MS determines if the current frame number is identical to a frame number corresponding to a Next Periodic Ranging IE received through the SLP-RSP message in step 627. When the current frame number is not identical to the frame number corresponding to the Next Periodic Ranging IE, the procedure returns to step 613. However, when the current frame number is identical to the frame number corresponding to the Next Periodic Ranging IE, step 629 is performed.

As described in Tables 9 and 10, the Next Periodic Ranging IE may indicate the frame offset up to a Periodic Ranging Opportunity from a reception of the SLP-RSP message or the RNG-RSP message including the Ranging Status having the value of 3. In this case, the MS adds the Next Periodic Ranging IE value to a frame number at which the SLP-RSP message or the RNG-RSP message has been received, and calculates and understands a frame number at which the MS is to transit to the awake mode. Accordingly, when the current frame number is identical to that calculated/understood by the MS, step 629 is performed. However, when the current frame number is not identical to that calculated/understood by the MS, the procedure returns to step 613.

In step 629, because the MS has arrived at the frame corresponding to the Next Periodic Ranging IE, the MS performs a periodic ranging operation. The periodic ranging operation represents an operation for compensating for the frequency, time, and transmit power while repeating transmission of the RNG-REQ message to the BS and reception of the RNG-RSP message for the RNG-REQ message from the BS as described above.

In step 631, the MS determines if the periodic ranging operation has been completed. Herein, the MS can determine if the periodic ranging operation has been completed by confirming if the Ranging Status of the RNG-RSP message received from the BS has a value of 3. When the periodic ranging operation has not been completed, the procedure returns to step 629.

When the periodic ranging operation has been completed, the MS detects and stores a Next Periodic Ranging IE included in an RNG-RSP message finally received from the BS in step 633.

In step 635, the MS determines if the MS stays in a sleep interval after the periodic ranging operation. When the MS does not stay in the sleep interval, step 625 is performed. However, when the MS stays in the sleep interval, in step 623, the MS transits from the awake mode to the sleep mode. Thereafter, the procedure ends.

Figure 7:
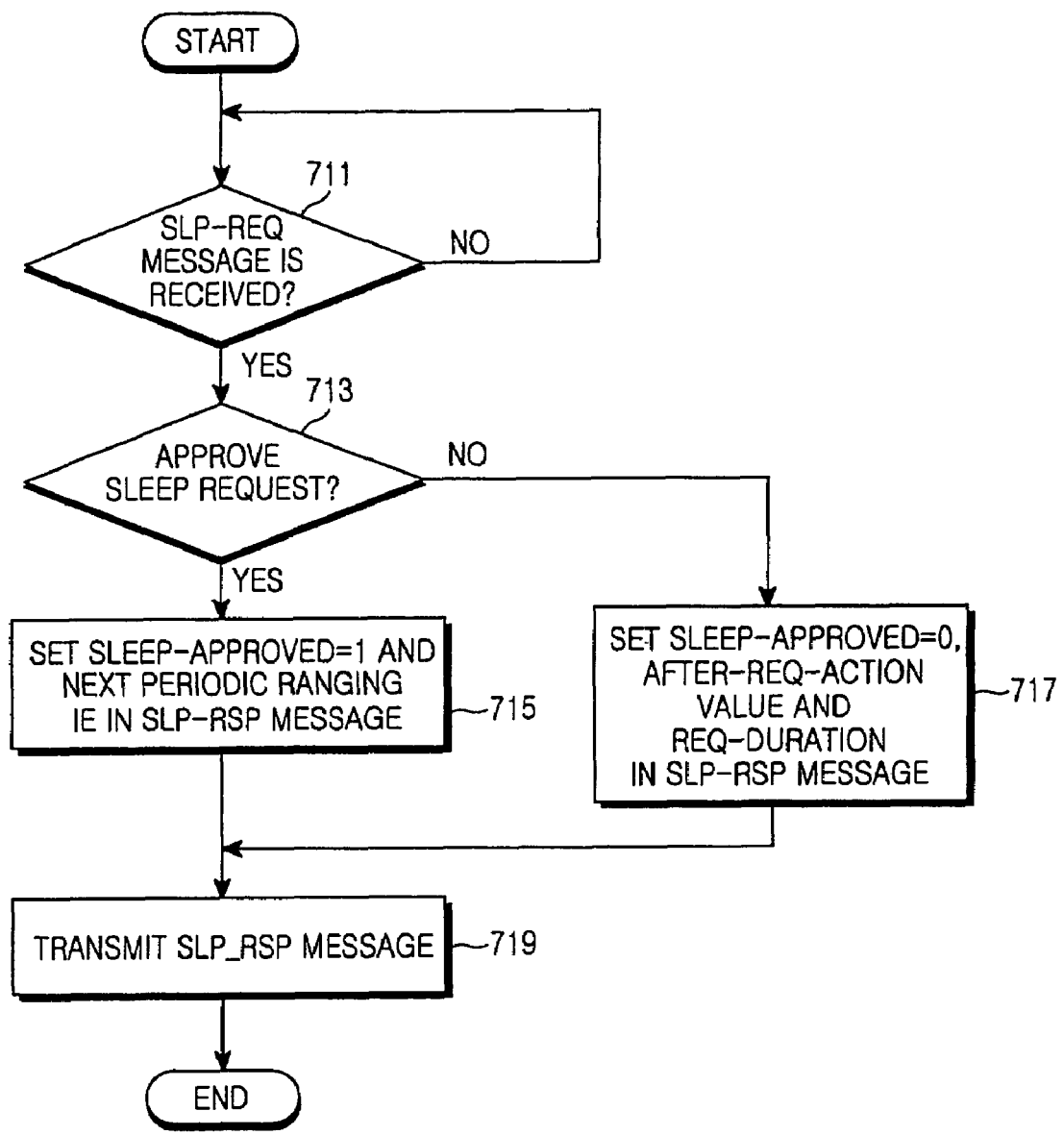
FIG. 7 is a flow diagram illustrating a sleep response operation process of a BS for a sleep request of an MS according to an embodiment of the present invention.

FIG. 7 is a flow diagram illustrating a sleep response operation process of a BS for a sleep request of an MS according to an embodiment of the present invention. Referring to FIG. 7, in step 711, the BS determines if an SLP-REQ message is received from the MS. When the SLP-REQ message is received from the MS, n step 713, the BS having received the SLP-REQ message from the MS determines whether to approve the sleep request of the MS, i.e., whether to approve a mode transition to a sleep mode of the MS, according to the circumstances of the BS and the MS. When the BS approves the sleep request of the MS, step 715 is performed.

In step 715, the BS sets a SLEEP-APPROVED to have a value of 1, which represents an approval for the sleep request of the MS, in an SLP-RSP message, which is a response message for the SLP-REQ message, and sets a Next Periodic Ranging IE.

In step 719, the BS transmits the SLP-RSP message to the MS. Thereafter, the procedure ends.

However, when the BS does not approve the sleep request of the MS, in step 717, the BS sets the SLEEP-APPROVED to have a value of 0, and sets an AFTER-REQ-Action value and a REQ-Duration.

Figure 8:
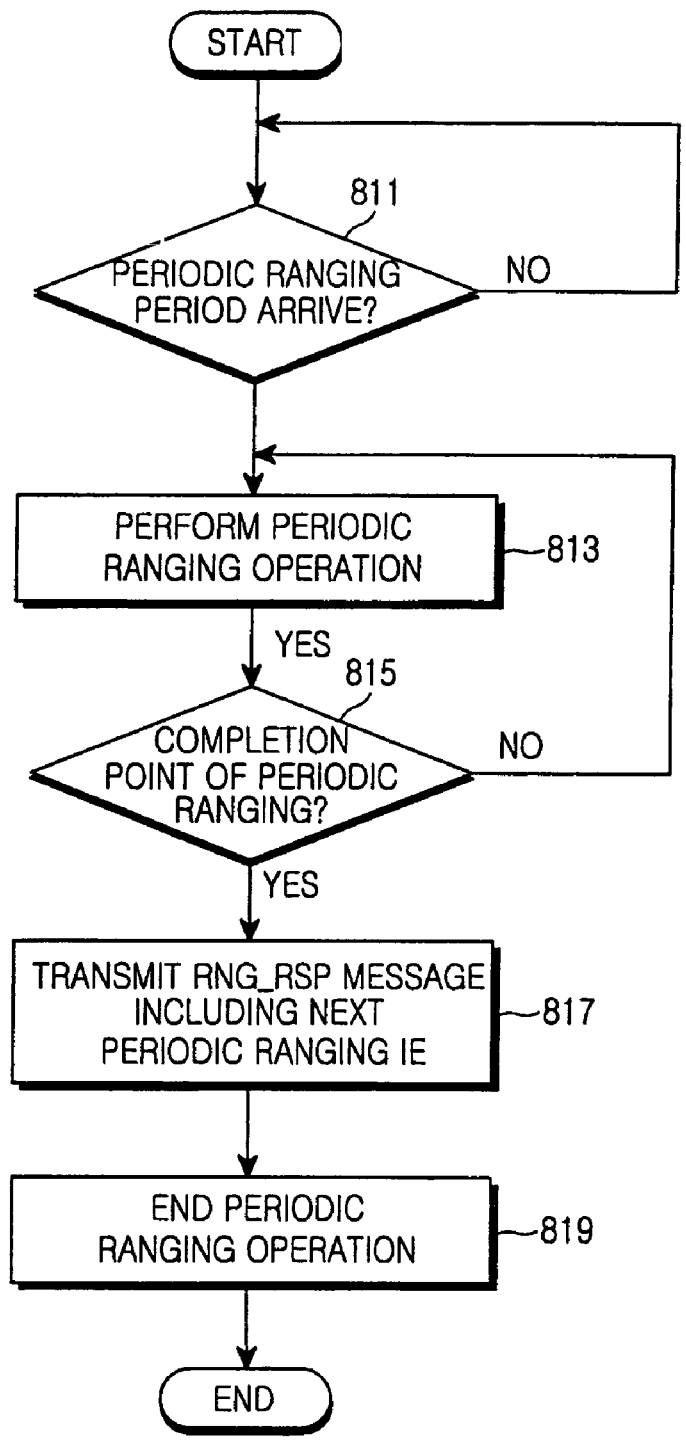
FIG. 8 is a flow diagram illustrating a periodic ranging operation process of a BS with an MS according to an embodiment of the present invention.

FIG. 8 is a flow diagram illustrating a periodic ranging operation process of a BS with an MS according to an embodiment of the present invention. Referring to FIG. 8, in step 811, the BS determines if the BS has arrived at a periodic ranging period. When the BS has arrived at the periodic ranging period, in step 813, the BS performs the periodic ranging operation with the corresponding MS, i.e., the BS performs exchange operations of an RNG-REQ message and an RNG-RSP message with the corresponding MS.

In step 815, the BS determines if the BS has arrived at a point in time at which the periodic ranging operation is to be completed, i.e., it is not necessary to compensate for the frequency, time, and transmit power any more by the MS. When the BS has not arrived at the point in time at which the periodic ranging operation is to be completed, the procedure returns to step 813.

When the BS has arrived at the point in time at which the periodic ranging operation is to be completed, in step 817, the BS transmits the RNG-RSP message including a Next Periodic Ranging IE to the MS. Herein, the Ranging Status of the RNG-RSP message for completing the periodic ranging operation is set to have a value of 3 as described above.

In step 819, the BS ends the periodic ranging operation with the MS, and then ends the procedure.

As described above, the present invention supports a sleep mode operation and an awake mode operation, and also a periodic ranging operation in a BWA communication system using an OFDM/OFDMA scheme, i.e., an IEEE 802.16e communication system. More specifically, the present invention supports a periodic ranging operation of an MSS operating in a sleep mode in an IEEE 802.16e communication system, thereby ensuring backward compatibility and providing reliable communication with minimum power consumption. Consequently, the present invention can improve a Quality of Service(QoS).

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for performing a periodic ranging by a receiver in a sleep mode of a wireless communication system, the method comprising the steps of:
   receiving a sleep mode transition message to transit into a sleep mode, the sleep mode transition message including first information relating to a timing point at which the periodic ranging is performed;
   transiting to the sleep mode in response to the sleep mode transition message; and
   performing the periodic ranging at a timing point corresponding to the first information after transiting to the sleep mode,
   wherein the first information indicates an offset of a frame in which the periodic ranging will be performed with respect to a frame where the sleep mode transition message is transmitted.

2. The method as claimed in claim 1, wherein performing the periodic ranging comprises:
   transiting from the sleep mode to an awake mode if the receiver stays in the sleep mode at the timing point corresponding to the first information; and
   performing the periodic ranging after transiting to the awake mode.

3. The method as claimed in claim 2, further comprising:
   receiving a periodic ranging completion notification including second information relating to a timing point at which a next periodic ranging is performed; and
   transiting from the awake mode to the sleep mode when a timing point at which the periodic ranging completion notification has been received is identical to a timing point corresponding to the sleep mode.

4. The method as claimed in claim 3, further comprising a step of maintaining the awake mode when the timing point at which the periodic ranging completion notification has been received is not identical to the timing point corresponding to the sleep mode.

5. The method as claimed in claim 3, wherein the second information includes a time offset between the timing point at which the periodic ranging completion notification has been received and the timing point at which the next periodic ranging is performed.

6. The method as claimed in claim 1, further comprising:
   performing the periodic ranging in an awake mode if when the receiver stays in the awake mode at the timing point corresponding to the first information.

7. The method as claimed in claim 6, further comprising:
   receiving a periodic ranging completion notification including second information relating to a timing point at which a next periodic ranging is performed, while the periodic ranging in the awake mode is performed; and
   transiting from the awake mode to the sleep mode when a timing point at which the periodic ranging completion notification has been received is identical to a timing point corresponding to the sleep mode,
   wherein the second information indicates a time offset between a frame at which the periodic ranging completion notification has been received and a frame at which the next periodic ranging is performed.

8. The method as claimed in claim 7, further comprising:
   maintaining the awake mode when the timing point at which the periodic ranging completion notification has been received is not identical to the timing point in time corresponding to the sleep mode.

9. A method for performing a periodic ranging by a transmitter in a sleep mode of a wireless communication system, the method comprising the steps of:
   transmitting a sleep mode transition message to transit into a sleep mode of a receiver, the sleep mode transition message including first information relating to a timing point at which the periodic ranging is performed; and
   performing the periodic ranging with the receiver that has transited into the sleep mode, at a timing point corresponding to the first information, after transmitting the sleep mode transition message,
   wherein the first information indicates an offset of a frame in which the periodic ranging will be performed with respect to a frame where the sleep mode transmission message is transmitted.

10. The method as claimed in claim 9, wherein performing the periodic ranging comprises:
   transmitting a periodic ranging completion notification including second information relating to a timing point at which a next periodic ranging is performed, when it is determined that the periodic ranging in progress must be completed.

11. The method as claimed in claim 10, wherein the second information includes a time offset between a timing point at which a receiver receives the periodic ranging completion notification and the timing point at which the next periodic ranging is performed.

12. A system for performing a periodic ranging in a sleep mode of a wireless communication system, the system comprising:
   a transmitter for transmitting a sleep mode transition message to transit into a sleep mode, the sleep mode transition message including first information relating to a timing point at which the periodic ranging is performed; and
   a receiver for transiting to the sleep mode in response to the sleep mode transition message, and performing the periodic ranging at a timing point corresponding to the first information after transiting to the sleep mode,
   wherein the first information indicates an offset of a frame in which the periodic ranging will be performed with respect to a frame where the sleep mode transition message is transmitted.

13. The system as claimed in claim 12, wherein the receiver transits from the sleep mode to an awake mode if the receiver stays in the sleep mode at the timing point cooresponding to the first information and performs the periodic ranging after transiting to the awake mode.

14. The system as claimed in claim 12, wherein the transmitter transmits a periodic ranging completion notification including second information relating to a timing point at which a next periodic ranging is performed when the transmitter determines that the periodic ranging in progress must be completed.

15. The system as claimed in claim 14, wherein, after receiving the periodic ranging completion notification while the periodic ranging is performed, the receiver transits from the awake mode to the sleep mode when a timing point at which the receiver has received the periodic ranging completion notification is identical to a timing point corresponding to the sleep mode.

16. The system as claimed in claim 15, wherein the receiver maintains the awake mode when the timing point at which the receiver has received the periodic ranging completion notification is not identical to the timing point corresponding to the sleep mode.

17. The system as claimed in claim 16, wherein the second information includes a time offset between the timing point at which the periodic ranging completion notification has been received and the timing point at which the next periodic ranging is performed.

18. A method for performing a periodic ranging by a receiver in a sleep mode of a wireless communication system, the method comprising the steps of:
   receiving a ranging response message to transit into a sleep mode, the ranging response message including first information relating to a timing point at which the periodic ranging is performed; and
   transiting to the sleep mode in response to the ranging response message; and
   performing the periodic ranging at a timing point corresponding to the first information after transiting to the sleep mode,
   wherein the first information indicates an offset of a frame in which the periodic ranging will be performed with respect to a frame where the ranging response message is transmitted.

19. The method as claimed in claim 18, wherein the ranging response message includes the first information and a ranging status set to success.

* * * * *

UNITED STATES PATENT AND TRADEMARK OFFICE
CERTIFICATE OF CORRECTION

PATENT NO. : 7,603,147 B2 Page 1 of 1
APPLICATION NO. : 11/125278
DATED : October 13, 2009
INVENTOR(S) : Son et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 495 days.

Signed and Sealed this

Fifth Day of October, 2010

David J. Kappos
*Director of the United States Patent and Trademark Office*